Aug. 16, 1938.   E. F. NELSON   2,127,004
METHOD OF FRACTIONATION
Filed Oct. 7, 1936
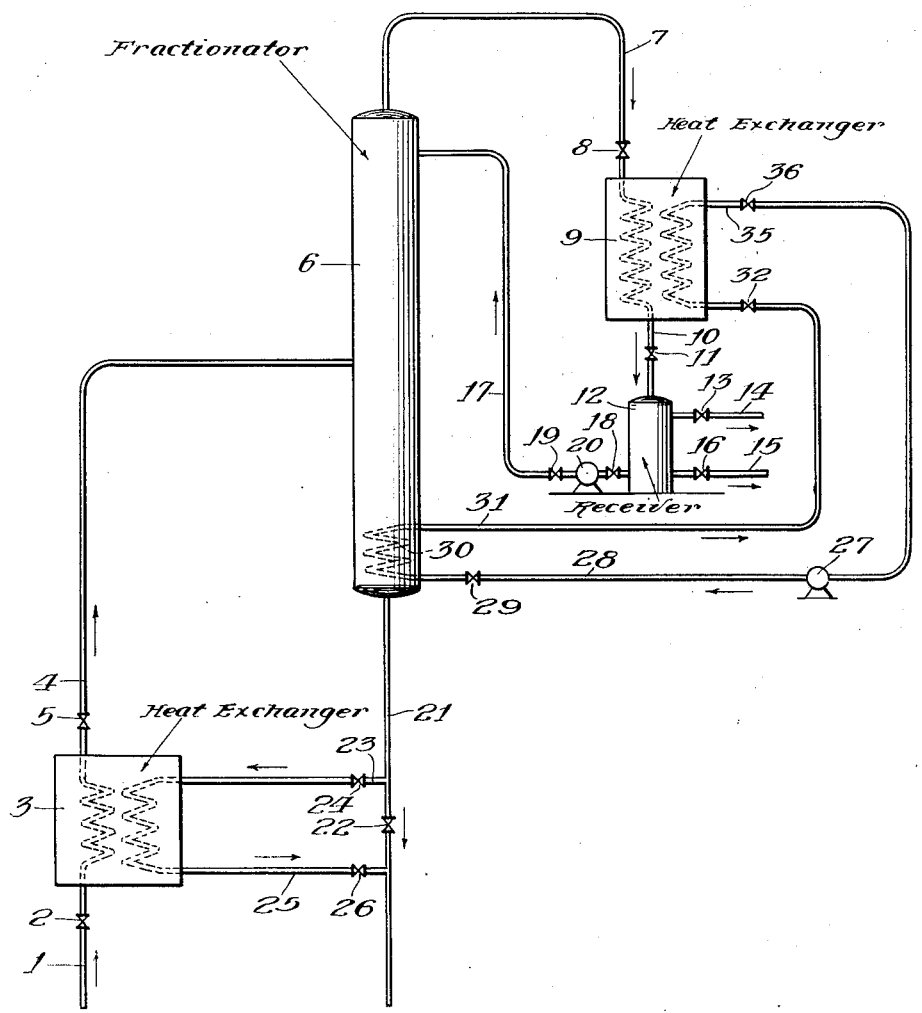
Inventor:
Edwin F. Nelson,
By: Lee J. Gary
Attorney Patented Aug. 16, 1938

2,127,004

UNITED STATES PATENT OFFICE 2,127,004

METHOD OF FRACTIONATION

Edwin F. Nelson, Chicago, Ill., assignor to Universal Oil Products Company, Chicago, Ill., a corporation of Delaware Application October 7, 1936, Serial No. 104,460

4 Claims. (Cl. 62—175.5)

This invention relates particularly to a process for close fractionation of low-boiling hydrocarbon mixtures.

The development of the chemical industries has made necessary the sharp separation of constituents from mixtures. This is particularly true in the petroleum art which deals with normally gaseous hydrocarbons. Formerly hydrocarbon gases were used primarily as fuel. Today because of new and improved processes these gaseous components are put to special uses for the production of particularly desirable products.

One of the latest developments is the use of olefins in hydrocarbon gas mixtures for the production of liquid polymers. In another process alcohols are produced from normally gaseous hydrocarbons. Other instances of the utilization of these gaseous hydrocarbons are in the production of solvents, and pure compounds, such as butane, ethylene, acetylene, propane, etc.

Unfortunately, these gaseous hydrocarbons do not occur in nature or as a result of an artificial process as pure compounds but rather are found in mixtures of hydrocarbons. Obviously it becomes necessary to separate the constituents in these hydrocarbon gaseous mixtures either prior, during, or subsequent to a treatment for the manufacture of derivatives of a pure hydrocarbon compound. When the following table giving the boiling points of the normally gaseous hydrocarbons occurring in mixtures is considered, the necessity for an improved system of close fractionation of these hydrocarbons is appreciated.

| Compound | Formula | Boiling point °F. |
|---|---|---|
| Methane | $CH_4$ | −259 |
| Ethane | $CH_3—CH_3$ | −127 |
| Ethylene | $CH_2=CH_2$ | −157 |
| Propane | $CH_3CH_2CH_3$ | −49 |
| Propylene | $CH_3CH=CH_2$ | −54 |
| Normal butane | $CH_3CH_2CH_2CH_3$ | +34 |
| Trimethyl methane | $CH_3CH(CH_3)_2$ | +1 |
| Ethyl ethylene | $CH_3CH_2CH=CH_2$ | +23 |
| Dimethyl ethylene | $CH_3CH=CHCH_3$ | +34 |

One specific embodiment of the invention comprises subjecting a fluid mixture to fractionation, separately compressing a gaseous refrigerating medium thereby generating heat, passing the heated refrigerating medium in indirect heat exchange with the higher-boiling refluxes in the fractionating column, thereafter reducing pressure on the refrigerating medium, passing the expanded and cooled refrigerating medium in indirect heat exchange with the vaporous constituents removed from the top of the fractionator to cool and condense said constituents and finally returning refrigerating medium to further compression and reuse.

Another specific embodiment comprises subjecting a mixture of normally gaseous hydrocarbons to the above fractionating treatment.

The attached diagrammatic drawing illustrates one form of apparatus in which the invention may be carried out.

A fluid mixture is introduced in line 1 through valve 2 and then passes through heat exchanger 3 wherein it may be pre-heated by indirect contact with the residual high-boiling constituents leaving the bottom of the fractionating column. The pre-heated fluid is then introduced at some intermediate predetermined level in the fractionating column 6 by way of line 4 and valve 5. Fractionating column 6 preferably consists of a bubble tower employing an unusually large number of plates to secure close fractionation of the constituents undergoing separation therein. Any well known type of fractionating column or series or combination of fractionating means may be utilized without departing from the scope of the invention. Although sub-atmospheric or atmospheric pressure may be used on the tower, it may be found desirable in some cases to employ super-atmospheric pressure.

From the top of the fractionating column 6 the desired distillate product is removed through line 7 and valve 8 and thence is cooled and condensed in cooler 9 by means of indirect heat exchange with the refrigerant. The cooled and condensed product emerging from heat exchanger and condenser 9 passes through line 10 and valve 11 into receiver 12 for separation and collection. Any desired pressure may be maintained on the system by controlling the rate of gas released through valve 13 in line 14.

The overhead distillate product is removed from the bottom of receiver 12 and sent to storage through line 15 and valve 16. The proper temperature may be maintained in the top of fractionating column 6 by returning a portion of the condensed overhead product through line 17, valves 18 and 19, and pump 20.

The residual constituents separated from the fluid mixture in the fractionating column are removed from the bottom of the fractionating column through line 21 and valve 22. If desired, some of the heat content in the residual constituents may be imparted to the entering fluid mixture by passing same through line 23, valve 24, indirect heat exchanger 3 and line 25 and valve 26.

In a separate closed cycle the refrigerating medium is compressed to a high super-atmospheric pressure by means of compressor 27. As a result, considerable heat is generated. The refrigerant is then passed through line 28 and valve 29 into closed coil 30 inserted in the lower portion of fractionating column 6 whereby it gives up some of its contained heat to the fluid mixture undergoing fractionation. The partially cooled refrigerant leaving coil 30 passes through line 31 and through reducing valve 32 for the purpose of effecting substantial reduction in pressure and thereby causing the refrigerant to expand and be considerably reduced in temperature. The expanded refrigerant flows through heat exchanger 9 thus indirectly contacting and thereby cooling and condensing the vaporous constituents leaving the top of fractionating column 6. The gaseous refrigerant then flows through line 35 and valve 36 into compressor 37 for further compression and thus completes the cycle.

As one specific example of the present invention a mixture of butane and propane is introduced into a fractionating column maintained at approximately 30 pounds gauge pressure. The top of the fractionating column may be maintained at $-10°$ F. and the bottom at $65°$ F.

Pure propane is recovered as the overhead product in the fractionating column and substantially pure butane is removed as a residuum from the bottom. In a separate closed cycle ammonia may be compressed to approximately 200 pounds and thereby attain a temperature of $95°$ F. The compressed ammonia passes through a closed coil in lower portion of the fractionating column and imparts some of its heat to the mixture of propane and butane undergoing fractionation. The ammonia leaving the closed coil in the bottom of the fractionator is reduced to substantially atmospheric pressure, thus causing the temperature of the ammonia to fall to approximately $-26°$ F. The lower temperature ammonia is passed into indirect heat exchange with the propane leaving the fractionating tower for the purpose of cooling and condensing same. Thereafter the ammonia gas is returned to the compressor for further compression and the cycle continued.

The above example is illustrative only and not to be considered as a limitation on the scope of the invention.

I claim as my invention:

1. An improved fractionating process which comprises subjecting a fluid mixture to fractionation in a fractionating column, continuously removing the more volatile constituents of said mixture as vapors from the upper portion of the fractionating column and withdrawing the heavier liquid constituents from the lower portion of the fractionating column, simultaneously compressing a refrigerating medium in a separate closed cycle thereby generating heat, passing the heated medium in indirect heat exchange with the fluid mixture in the bottom of the fractionating column, thereafter reducing the pressure on the refrigerating medium, passing the expanded and cooled refrigerating medium in indirect heat exchange with said more volatile constituents of the mixture removed as vapors from the top of the fractionating column and cooling and condensing the withdrawn more volatile constituents, recovering the resultant condensate, and finally returning the refrigerating medium to repeat the cycle of compression and expansion.

2. An improved fractionating process which comprises subjecting a mixture of normally gaseous hydrocarbons to fractionation in a fractionating column, continuously removing the more volatile constituents of said mixture as vapors from the upper portion of the fractionating column, withdrawing the heavier liquid constituents from the lower portion of the fractionating column, simultaneously compressing a refrigerating medium in a separate closed cycle thereby generating heat, passing the heated medium in indirect heat exchange with the hydrocarbon mixture in the bottom of the fractionating column, thereafter reducing the pressure on the refrigerating medium, passing the expanded refrigerating medium in indirect heat exchange with said more volatile constituents of the mixture removed as vapors from the top of the fractionating column and cooling and condensing the withdrawn more volatile constituents, recovering the resultant condensate, and finally returning the refrigerating medium to repeat the cycle of compression and expansion.

3. An improved fractionating process which comprises subjecting a fluid mixture to fractionation in a fractionating column maintained under super-atmospheric pressure, continuously removing the more volatile constituents of said mixture as vapors from the upper portion of the fractionating column, withdrawing the heavier liquid constituents from the lower portion of the fractionating column, simultaneously compressing a refrigerating medium in a separate closed cycle thereby generating heat, passing the heated medium in indirect heat exchange with the fluid mixture in the bottom of the fractionating column, thereafter reducing the pressure on the refrigerating medium, passing the expanded refrigerating medium in indirect heat exchange with said more volatile constituents of the mixture removed as vapors from the top of the fractionating column and cooling and condensing the withdrawn more volatile constituents, recovering the resultant condensate and finally returning the refrigerating medium to repeat the cycle of compression and expansion.

4. An improved fractionating process which comprises subjecting a mixture of normally gaseous hydrocarbons to fractionation in a fractionating column maintained under super-atmospheric pressure, continuously removing the more volatile constituents of said mixture as vapors from the upper portion of the fractionating column, withdrawing the heavier liquid constituents from the lower portion of the fractionating column, simultaneously compressing a refrigerating medium in a separate closed cycle thereby generating heat, passing the heated medium in indirect heat exchange with the hydrocarbon mixture in the bottom of the fractionating column, thereafter reducing the pressure on the refrigerating medium, passing the expanded refrigerating medium in indirect heat exchange with said more volatile constituents of the mixture removed as vapors from the top of the fractionating column and cooling and condensing the withdrawn more volatile constituents, recovering the resultant condensate and finally returning the refrigerating medium to repeat the cycle of compression and expansion.

EDWIN F. NELSON.